United States Patent [19]

Wallow et al.

[11] Patent Number: 4,702,172
[45] Date of Patent: Oct. 27, 1987

[54] SABOT ARRANGEMENT FOR A SUB-CALIBER PROJECTILE

[75] Inventors: Peter Wallow, Duesseldorf; Klaus Gersbach, Willich; Walter Simon, Heizogenrath; Bernhard Bisping, Ratingen, all of Fed. Rep. of Germany; Patrick Montier; Pierre A. Moreau, both of Bourges, France

[73] Assignees: Rheinmetall GmbH, Duesseldorf, Fed. Rep. of Germany; Etat Francais represente par le Deleuge General pour l'armement, Paris, France

[21] Appl. No.: 733,965

[22] Filed: May 14, 1985

Related U.S. Application Data

[63] Continuation-in-part of Ser. No. 642,713, Aug. 20, 1984.

[30] Foreign Application Priority Data

Sep. 3, 1980 [DE] Fed. Rep. of Germany ..... 30330417

[51] Int. Cl.⁴ ............................................. F42B 13/16
[52] U.S. Cl. ................................................... 102/521
[58] Field of Search ................... 102/514–516, 102/520–524, 529, 532, 703

[56] References Cited

U.S. PATENT DOCUMENTS

| | | | |
|---|---|---|---|
| 2,616,372 | 11/1952 | Frantik | 102/523 |
| 2,638,051 | 5/1953 | Critchfield | 102/522 |
| 2,968,246 | 1/1961 | Dunlap et al. | 102/523 |
| 3,262,391 | 7/1966 | Shober | 102/521 |
| 3,862,603 | 1/1975 | Kornblith et al. | 102/522 |
| 4,187,783 | 2/1980 | Campoli et al. | 102/520 |
| 4,326,464 | 4/1982 | Price | 102/523 |

Primary Examiner—Deborah L. Kyle
Assistant Examiner—Ted L. Parr

[57] ABSTRACT

A sabot arrangement is produced in accordance with an improved manufacturing method. The sabot arrangement includes a rotational symmetrical sabot body having a central axial bore and radial separating grooves or slots. The radial grooves or slots divide the sabot body into a plurality of equal segments. These slots nearly sever the sabot body into separate segments, so that a material bridge remains near a forward edge and a material bridge remains near a rear edge of the sabot body, which material bridges function as fracture zones.

10 Claims, 16 Drawing Figures

SABOT ARRANGEMENT FOR A SUB-CALIBER PROJECTILE

CROSS-REFERENCE TO RELATED APPLICATION

This application is a continuation-in-part application of our copending application Ser. No. 06/642,713, filed on Aug. 20, 1984.

BACKGROUND OF THE INVENTION

The invention relates to a process for preparing blanks for sabot bodies and the sabot arrangement obtained thereby.

A sabot arrangement of the afore-described type is generally manufactured as follows:

A first rotational symmetrical body, having the contour of the sabot, is severed by means of longitudinal axial cuts into the segments in such a way that the material loss due to a corresponding arrangement of the severing cuts is taken into consideration. Thus, with cutting into three parts, a first divided portion forms with one or more segments of a second divided portion, a rotational symmetrical sabot body, to form jointly one sabot arrangement. To achieve this result, the contacting surfaces of the segments must be precisely finished and must have smooth surface characteristics. These segments are arranged about the projectile and are maintained thereabout by means of a foreign element, for example a guide band or sealing element having fracture zones, which maintain the segments in assembly until its disintegration upon leaving the muzzle of the gun barrel. Generally the projectile, as well as the segments, in their mutual contacting regions, are provided with corresponding interacting form-locking means.

The known process for manufacturing a segmented sabot is disavantageously complex and cost intensive relative to the prospective material consumption as well as the required working. Additionally, each segment must be separately marked in accordance with its corresponding disposition on the preselected sabot arrangement. This is necessary in order to eliminate as much as possible a mistake due to an unintended interchange of the segments.

Exemplary of the state of the art are U.S. Pat. No. 3,262,391, Luxembourg published patent application Ser. No. 57539, and British Pat. No. 20 27 855. The sabot arrangement of U.S. Pat. No. 3,262,391 includes a plurality of metal discards which have radially outwardly increasing wall thicknesses. These same metal discards have a toothed inner contour and an even outer periphery. The segments contact the sub-caliber projectile approximately at its middle region, which sub-caliber projectile has a toothed outer peripheral surface in that region which matingly engages the toothed inner peripheral surface of the metal to form a form-locking connection. The rear surface of the sabot is provided with sealing means. The sub-caliber projectile is formed as an arrow-stabilized high-alititude probe and is fired out of a gun barrel having an elevation of about 90 degrees. The sabot of U.S. Pat. No. 3,262,391 is designed to mitigate a particular dangerous condition. When a sabot is formed by only three or four receiving members and to facilitate the conventional introduction of the sabot into the loading chamber of a weapon. The spin is achieved by frictional forces that act via the propellant bottom on the projectile and the fracture zones bring about the severance of the projectile into several segments via the centrifugal forces brought about by the spin of the projectile. The parts that fall off the projectile do not cause the afore-described danger to the personnel servicing the weapon because of their reduced mass. This projectile has, however, a significant drawback because it is designed to be used exclusively with spin-stabilized projectiles.

There is disclosed in British Patent No. 20 27 855 a process for producing a sabot out of metal and synthetic material. The arrow projectile of this patent has a sabot consisting of metal alloy and a shell of a plastic material directly cast on the projectile body. The casting of the peripheral form-locking means onto mating means on the projectile body is carried out in such a way that the metal melt forms in a predetermined peripheral region three separate bodies which interengage with the form-locking means on the projectile body. Such an arrangement is then involved in an injection molding process step whereby a synthetic material jacket surrounds the projectile and the three metallic bodies forming the sabot so that only a nose needs to be mounted on the sabot arrangement. While the arrow-projectile of the British Patent No. A 2027 855 is arrow-stabilized, repeated reference is made to a rifled bore. Taking the teachings of the British patent as a whole, the routineer skilled in the art would conclude that this patent refers to a sabot that operates under spin-stabilization. Moreover, the manufacturing process of the British patent is not suitable for ammunition of large caliber gun barrels. The volume of the metal melt that must be cast in the first mold requires substantial preheating steps. Even if such steps are supplied a secure form-locking between the projectile body and the sabot would not suffice to provide for a proper functioning of the sabot.

SUMMARY OF THE INVENTION

It is an object of this invention to provide a process for manufacturing a sabot of the afore-described type which, with relatively reduced production input achieves nevertheless flaw-free operation of the sabot while providing for a reduced average material density which is particularly significant with ammunition for large caliber weapons.

As the description of the method of the invention is set forth in greater detail hereinbelow, it will become obvious that the unitary construction and pre-segmenting steps of the manufacturing method result in a simplification of the manufacture. The method of the invention favors advantageously the object that the number of segments can be increased over the conventional number (which was also previously determined by manufacturing costs). The teachings of the invention also covers the design of the corresponding coating blank for the sabot body, whereby these teachings as well as the corresponding teachings regarding the manufacturing method are designed to simplify the entire construction in the sense to achieve the afore-mentioned reduction in dead weight.

BRIEF DESCRIPTION OF THE DRAWING

With these and other objects in view, which will become apparent in the following detailed description, the present invention, which is shown by example only, will be clearly understood in connection with the accompanying drawing, in which.

DETAILED DESCRIPTION

Figure 1:
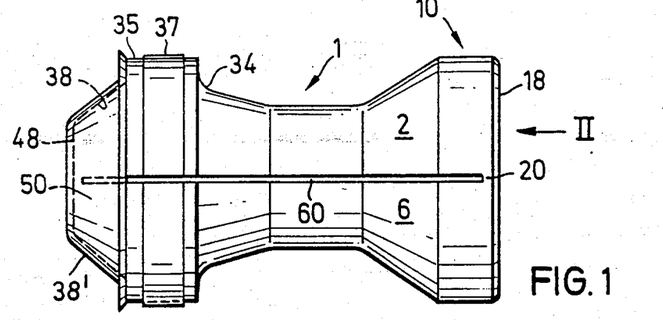
FIG. 1 is a plan view of a first embodiment of the sabot arrangement in accordance with the invention, wherein the sabot has three segments.
Figure 2:
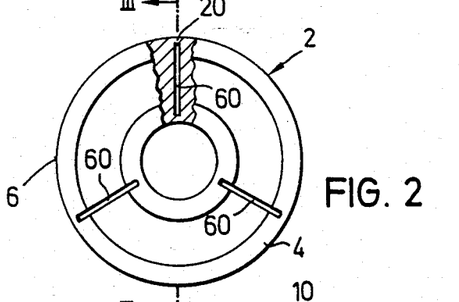
FIG. 2 illustrates an end view of the first embodiment of a sabot arrangement in the direction of arrow II in FIG. 1.
Figure 3:
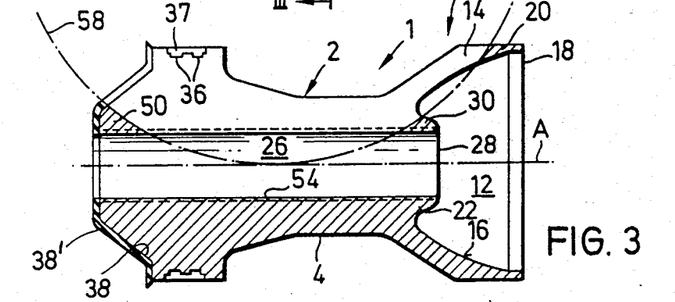
FIG. 3 is a longitudinal axial sectional view of the first embodiment of the sabot arrangement along lines III—III in FIG. 2.
Figure 4:
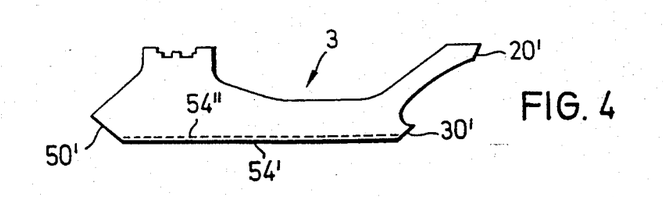
FIG. 4 is a side-elevational view of an element adapted to be inserted in a corresponding separating groove of the first embodiment of the sabot arrangement in accordance with FIGS. 1 through 3.

According to FIGS. 1, 2 and 3 there is illustrated a rotational-symmetrical sabot body 1 having an axial central bore 26 and three separating grooves 60, which are cut into the periphery of the sabot body 1, preferably by means of a non-illustrated slot milling machine. For purposes of clarification there is illustrated in FIG. 3 the outline 58 of such a slot cutter in dot-dash lines. Three equal segments 2, 4, and 6 are formed by means of the separating grooves 60. In front of a frontal region 10 there is disposed an air pocket 12 having an exterior wall 14 and an air-stream receiving surface 16 which terminates in a front edge 18. The exterior wall 14 is of unitary construction with respect to a central hub portion 22. This central hub portion 22 extends along a central longitudinal axis A between a front edge 28 and a rear edge 48. A flange 34 is of unitary construction with respect to the central hub portion 22; the flange 34 has on its periphery a double receiving groove 36 for receiving a guide ring and/or sealing element 37. A rear-facing gas pressure receiving surface 38 terminates at the rear edge 48. The separating grooves or slots 60 are arranged in such a way that in the region of the front edge 18 of the air pocket 12, in the region of the front edge 28 of the central hub portion 22, and in the region of the rear edge 48, there remains material which form material bridges 20, 30 and 50 making for a unitary construction, which material bridges also form fracture zones for the sabot assembly. The central bore 26 is provided wtih an internal thread 54 for form-lockingly joining the sabot arrangement with a non-illustrated projectile. In order to prevent an impermissible passage of the propellant gases during firing through the sabot arrangement, each one of the separating grooves or slots 60 are advantageously provided with an element 3, which is illustrated in FIG. 4. The element 3 is stamped out of sheet metal and has a contour which complements the contour of the sabot body 1 in the region of the corresponding separating grooves or slots 60. This stamped element 3 has narrow limit surfaces 20', 30' and 50', which bear against the mating material bridges 20, 30 and 50 and which complement the internal threaded part 54 in the region of a narrow surface 54' by means of a threaded part 54", not illustrated in detail.

A guide band 37 is introduced into the double groove 36 and is also provided with fracture zones, which guide band 37 fixes each element 3 into the corresponding separating groove or slot 60.

Figure 5:
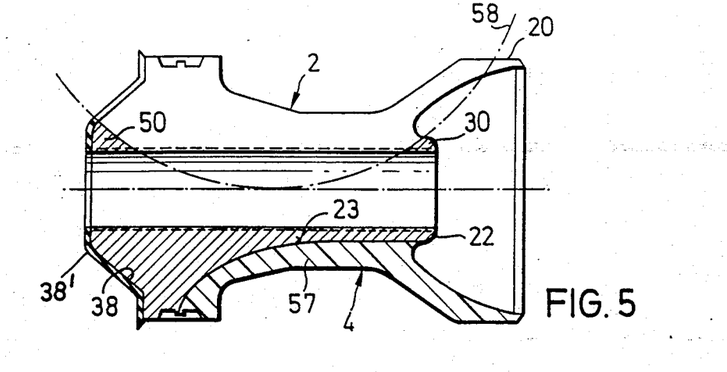
FIG. 5 is a side-elevational view of a sabot arrangement, partially in section, in accordance with a second embodiment of the invention, wherein the arrangement has three segments, one of which is shown in longitudinal section.

In the second embodiment of the sabot arrangement, which is illustrated in FIG. 5, there is provided an enclosing peripheral portion 57, made of synthetic material, which is joined with a central hub portion 22 along an exterior surface 23 thereof (by means of casting, spraying, or the like) so as to form a unitary construction therewith. In this embodiment the advantage of reduced dead weight is combined with the advantage of simplified manufacture. Elements 3, as is described hereinabove, can also be in this embodiment inserted into separating grooves or slots 60, which have been cut into the sabot body 1 by means of a slot cutter (the periphery of which is indicated by dot-dash line 58). The material bridges 20 in the embodiment of FIG. 5, are made out of synthetic material.

Figure 6:
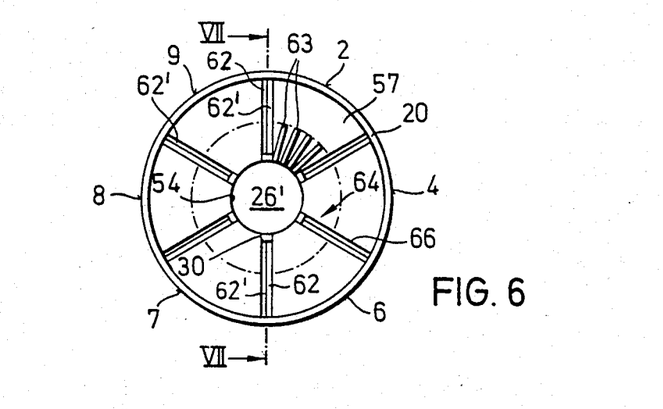
FIG. 6 illustrates an end view of a sabot arrangement in accordance with a third embodiment of the invention, which sabot arrangement has a total of six segments.
Figure 7:
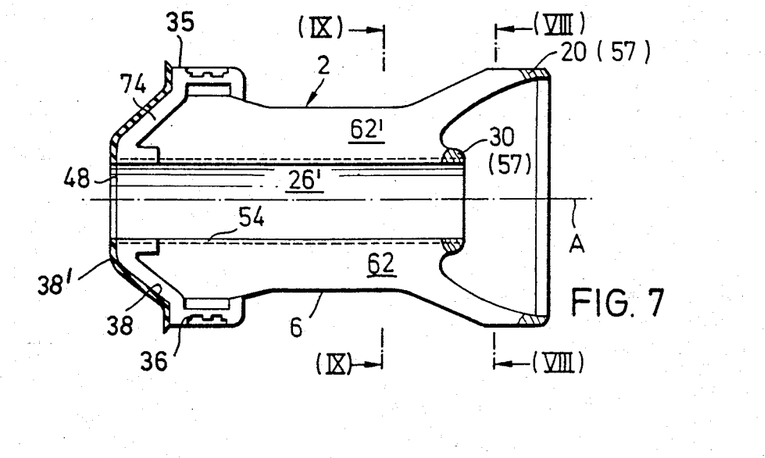
FIG. 7 illustrates the sabot arrangement of the third embodiment in section along the longitudinal axis and along lines VII—VII in FIG. 6.

The sabot arrangement illustrated in FIGS. 6 and 7 constitutes a third embodiment wherein six segments 2, 4, 6, 7, 8 and 9 form the sabot arrangement. The sabot body has a contour which mates with the shape of the stamped sheet metal parts 62, 62' and 63, and is also made out of a synthetic material 57, the stamped sheet metal parts being adapted to the contour of the sabot body 1. The arrangement includes a central bore 26'; the afore-mentioned sheet metal parts 62, 62' and 63 are arranged in such a way along a longitudinal axis A, that each one of the segments 2, 4, 6, 7, 8 and 9 are defined by the surfaces of a stamped sheet metal surface 62 and 62'. Stamped part 62 (respectively 62') are shaped similarly as element 3 (see FIG. 7). Stamped part 63 extends, at least in its forward region less radially, compared to the contours of parts 62, 62'. The shape of stamped part 63 is shown in FIGS. 6, 8, 9, 10 and 11. The stamped sheet metal part 62 (for example of stamped metal segment 9) and the stamped sheet metal 62' of stamped metal segment 2 are arranged immediately adjacent to each other along the separating slot 66. Reference number 64 indicates a so-called "butt-joint area" which encompasses the region in which the sabot segments 2, 4, 6, 7, 8 and 9 "push" the respective adjacent segments. From this follows that a symmetrical plane, defined by the separating slot 66, extends through the "butt-joint area" 64. In the region of the front edge 18 of the air pocket 12 as well as in the region of the front edge 28 in the vicinity of the central bore 26' the stamped sheet metal members 62 and 62' are shaped in such a way, that the material bridge 20 and 30, made out of synthetic material 57, are formed. As is illustrated in FIG. 7, the peripheral surface 35, the rear propellant gas receiving surface 38, the rear edge 48 as well as the double receiving groove 36 for receiving the sealing band 37 can be covered by means of a cover element 74, which is provided with non-illustrated fracture zones, and which forms a rear closure of the sabot arrangement. Advantageously, the cover element 74 can be formed as a so-called built-in template for the stamped sheet metal members 62, 62' and 63 and as such is disposed directly in a non-illustrated casting or spraying mold. The surfaces of the sheet metal member 62, 62' and 63 which confront the synthetic material 57 are treated with a chemical or other treatment, for example by immersion, to provide a protective layer, so as to be capable of being particularly intimately glue-joined with the hardened aforementioned filler material (made of synthetic material 57). In the region of their narrow surfaces with which the stamped members confront the central bore 26, they are provided wtih non-illustrated recesses, which mutually complement each other with portions of the threaded part 54. Advantageously, during the casting respectively spraying with hardened filling material 57 in the central bore 26', there is inserted a body provided with an external thread which corresponds to that of the projectile and which forms a forming core. In this manner the thread 54 can be formed without interruptions.

Figure 8:
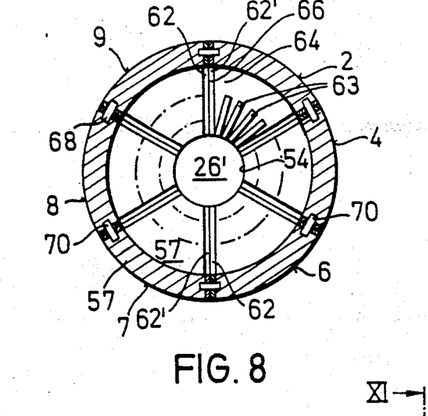
FIG. 8 is a sectional view transverse to the longitudinal axis along lines VIII—VIII of FIG. 7 of a fourth embodiment of the sabot arrangement having six segments, which is similar to the third embodiment.
Figure 9:
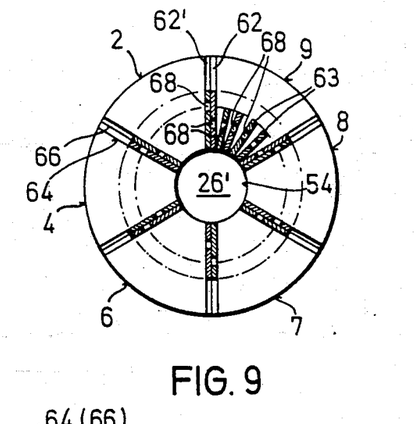
FIG. 9 illustrates a fourth embodiment of the sabot arrangement in cross-section, transverse to the longitudinal axis along lines IX—IX in FIG. 7.

The fourth embodiment of the sabot arrangement, as illustrated in FIGS. 8 and 9, is provided with six segments and differentiates itself from the third embodiment in particular in that the stamped sheet metal members 62, 62' and 63 are provided with bores or openings 68. These bores serve in the frontal region and in the region adjacent to the periphery of the stamped sheet metal members for receiving schematically illustrated smooth joining elements 70. These elements 70 form, in a simple manner, the corresponding previously described material bridges. In the tail region, the bores 68 serve for receiving the hardened synthetic material 57, so as to permit the formation of a particularly intimate joining between sheet metal and synthetic material. With the comparatively even more progressive material exchange, as described hereinabove, there is advantageously achieved a dead weight reduction.

Figure 10:
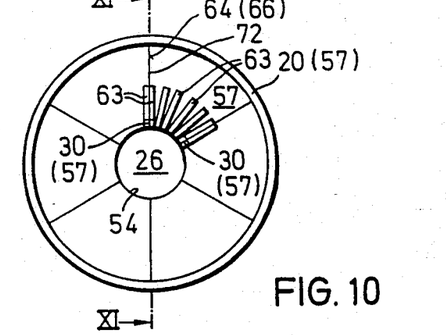
FIG. 10 illustrates a fifth embodiment of a sabot arrangement having six segments shown in an end elevational view.
Figure 11:
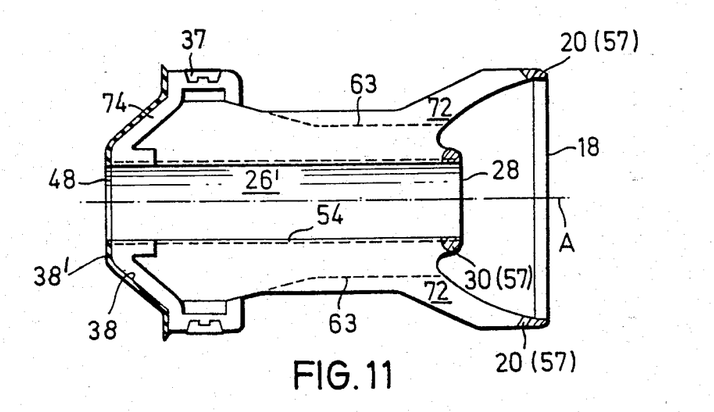
FIG. 11 is a longitudinal axial cross-sectional view along line XI—XI of FIG. 10 of the fifth embodiment of the sabot arrangement of the invention.

An advantageously even more progressed material exchange is effected in a fifth embodiment of the sabot arrangement in accordance with FIGS. 10 and 11. The stamped sheet metal members are also not different in this embodiment even in the corresponding butt-joint area 64. In a radially extending continuation of the separation slot 66 there is provided, for example, as separating means 72 a thin metal foil. This metal foil is cut in such a way that it permits the formation in the region of the front edge 18 of the material bridges 20 made out of hardened synthetic material 57.

As has been described hereinabove, the shape of the stamped members 63 in the region of the front edge 28, permits again the formation of material bridges 30 made out of hardened synthetic material 57 (FIG. 11).

Figure 12:
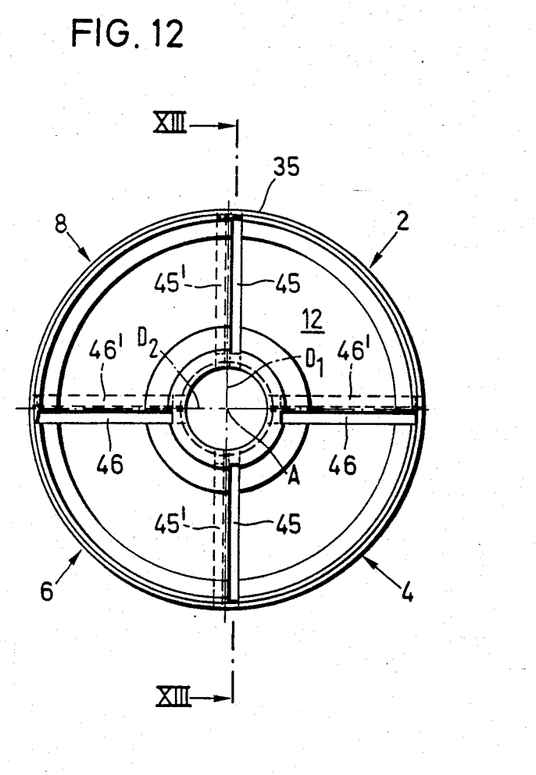
FIG. 12 is an end elevational view of the sixth embodiment of the sabot arrangement of the invention which has four segments.
Figure 13:
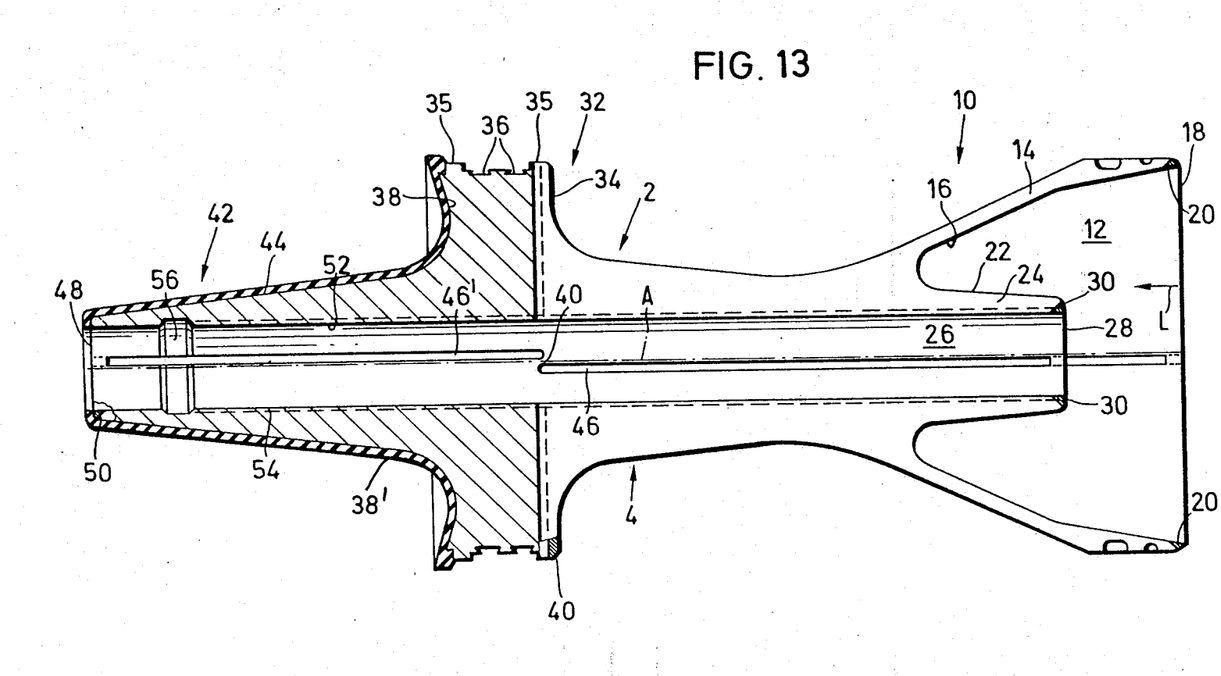
FIG. 13 illustrates a longitudinal axial sectional view of a sixth embodiment of a sabot arrangement along line XIII—XIII of FIG. 12.

There is illustrated a sixth embodiment of a sabot arrangement in accordance with the invention in FIGS. 12 and 13, wherein in a frontal region 10 there is formed an air pocket 12 having an exterior wall 14 and an air stream receiving surface 16 which terminates in a front edge 18. The exterior wall 14 is of unitary construction with respect to a wall 24 of a central hub portion 22, the central hub 22 extends along a central longitudinal axis A and has a central bore 26. There is disposed a flange 34 in the middle region 32 of the sabot arrangement, which flange is integral with the wall 24 of the hub 22. This flange 34 has at its exterior periphery, a double receiving groove 36 for a guide and/or sealing element 35. In the tail region of the arrangement there is again provided a pressure receiving surface 38 which extends towards an exterior surface 44 of a tail section 42 of the central hub 22. The separating slots 45, 45' and 46, 46' divide the sabot body into four segments 2, 4, 6 and 8, whereby in the region of the front edges 18 and 28, in the flange periphery 35, and in the rear edge, there form material bridges 20, 30, 40 and 50. These material bridges join the abutting segments in regions which have not been further illustrated in detail and safeguard the unitary construction of the sabot body. The inner peripheral surface 52 of the bore 26 is provided with a thread 54 and at its rear side ends in an internal recess 56; this arrangement serves for a form-locking between the sabot and a projectile which is disposed within the bore 26. The material bridges 20, 30, 40 and 50 are so dimensioned that they form fracture zones (between adjacent segments) in such a way, that they are fractured after the assembly leaves the muzzle of a gun barrel under the action of streaming air which acts on the assembly in the direction of the arrow L, so that the segments 2, 4, 6 and 8 now singly separate from the non-illustrated projectile and fall to the ground.

The illustrated embodiment has advantageously an even number of segments. This feature advantageously provides the possibility to introduce two separating slots (they are disposed in a lane parallel to a diameter $D_1$ ($D_2$) by means of one corresponding cutting step, for example by means of a band saw (FIG. 12).

The foregoing description clarifies a further advantage flowing from this embodiment, to wit: there is dispensed with the requirement of a high input in connection with the corresponding separating, respectively dividing slots between adjacent segments as was the case with the conventional processes; a mininum precision requirement is substantially only necessary for the dimensioning of the corresponding material bridges.

The afore-mentioned desideratum to increase the number of sabot segments, is based on the assumption that thereby the mass of the corresponding segments is reduced. Also the separation of segments from the projectile is facilitated. Additionally, the disturbing influence on the projectile due to the non-intended mutual contacting between projectile and one or more of the segments after the predetermined separation from the sabot, is reduced.

In order to block the propellant gases from passing through the separating block 45, 45', 46, 46', there can be provided a cover 38' which covers the gas-receiving surface 38 and the adjoining exterior surface 44 at least in the region of the separating slots, which cover is illustrated in FIGS. 1, 3, 5, 7, 11 and 13 and is analogous to the cover element 74.

Figure 14:
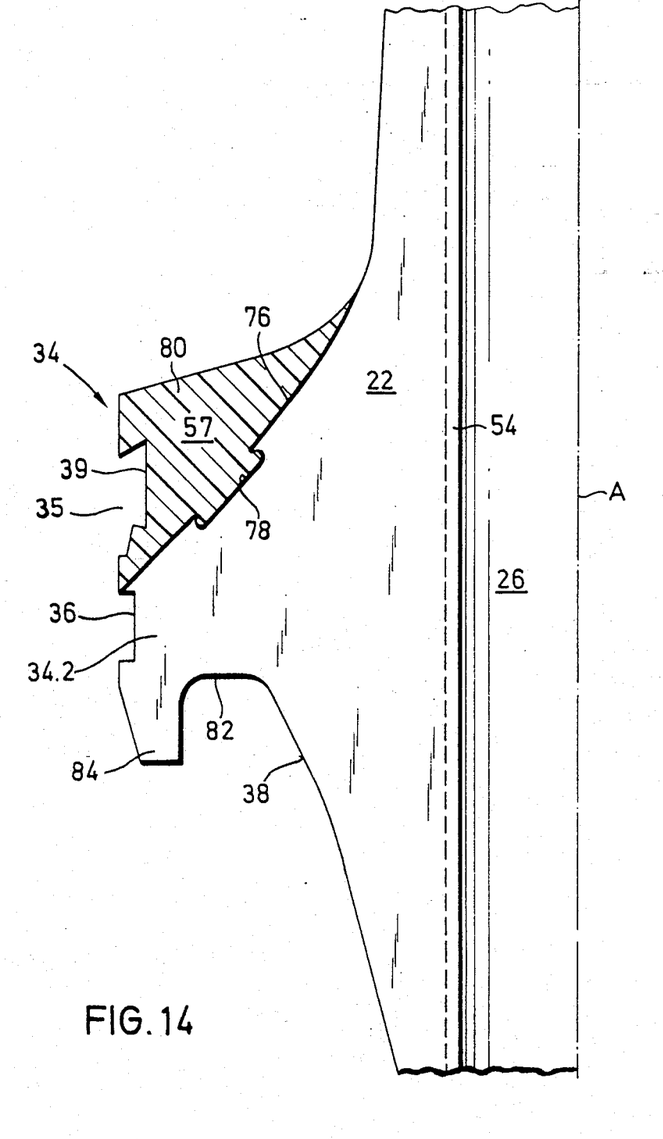
FIGS. 14 and 15 illustrate in longitudinal axial section the constructional details of a rear flange in the middle or rear region of the sabot arrangement, which sabot arrangement is also shown in longitudinal axial section, which constructions form two additional embodiments of the sabot arrangement of the invention.
Figure 15:
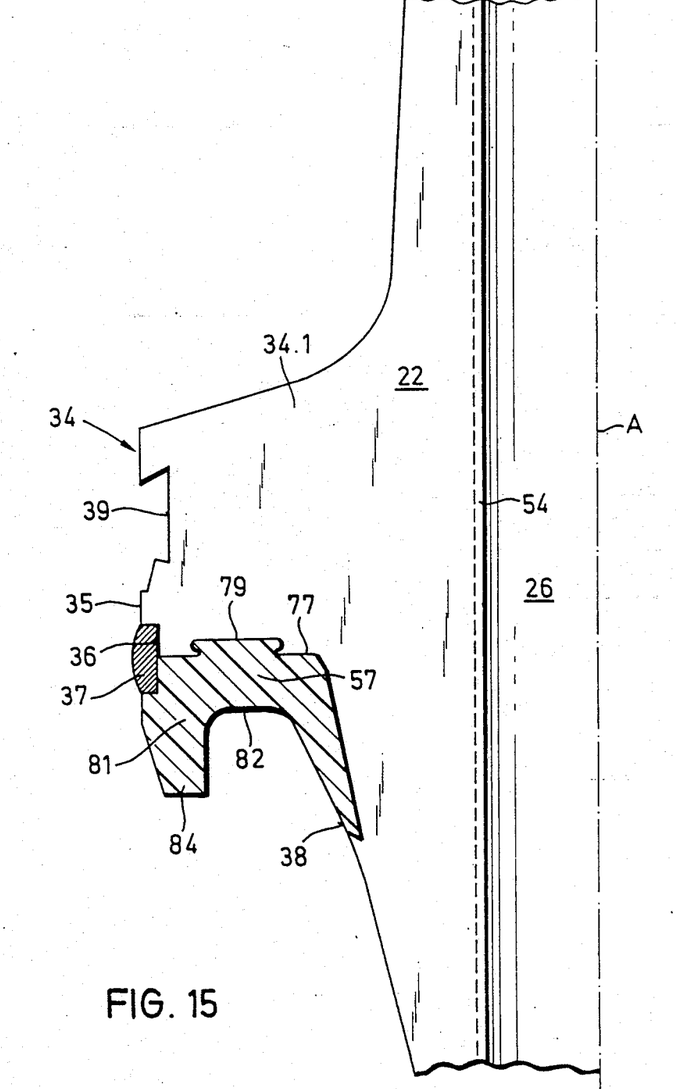
Figure 16:
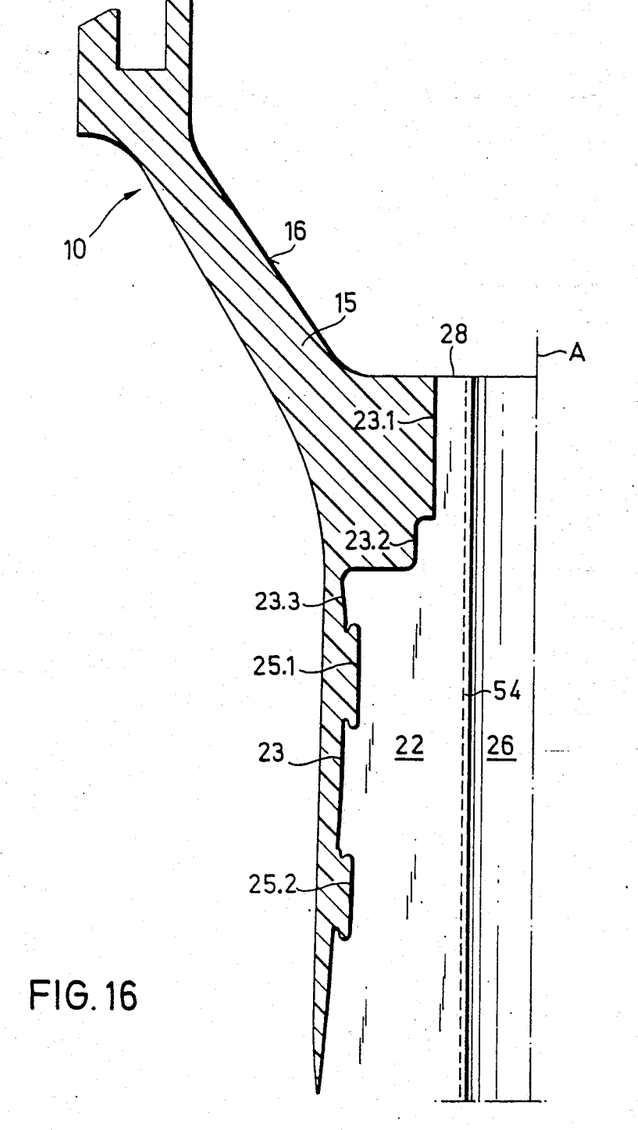
FIG. 16 illustrates in cross-section the front region of the sabot arrangement illustrated in FIGS. 14 or 15.

FIGS. 14, 15 and 16 illustrate material bridge constructions which constitute further embodiments of the sabot arrangement of the invention. In accordance with FIG. 14 the central part or hub 22 made out of light metal alloy has on the front side of the rearwardly disposed flange 34 a surface 76 which has a dove-tailed groove 78. A ring 80, made out of synthetic material 57, covers the surface 76 and extends within the dove-tailed groove 78. The ring 80 forms jointly with the part 34.2, made out of light metal alloy, the rearwardly disposed flange 34. There is provided in the flange periphery 35 in the ring 80 a receiving groove 39, whereas in the part 34.2 there is provided a receiving groove 36 for a non-illustrated guide band. The gas pressure receiving surface 38 continues in a recess 82 which is on its exterior side limited by the projection 84.

The front portion of the sabot arrangement can be constructed in accordance with FIG. 16, which front construction can be combined with the construction of FIG. 14 as well as with the construction of FIG. 15. The central hub portion 22 is made out of a light metal alloy and has the stepped parts 23.1 to 23.3 which form the exterior surface 23 having dove-tailed grooves 25.1, 25.2. The forward portion 10 is made out of synthetic material 57, whereby an exterior wall 15 is defined by the air stream receiving surface 16, which limits the exterior extent of the air pocket 12 and extends rearwardly over the periphery to the non-illustrated middle region and is secured on the stepped parts 23.1 to 23.3 and in the dove-tailed grooves 25.1 and 25.2 on the central hub part 22. The presegmenting and formation of material bridges results in the embodiments of FIGS. 14, 15 and 16 analogously to the previously described embodiments. The formation of the stamped metal blanks is also evident from the prior description of the different sabot arrangements. The object of the invention is to reduce as much as possible the work input for producing sabot arrangements. for example, in the arrangement of the sabot body, its central hub portion can be of unitary construction and be made out of metal, the corresponding blank can be preperforated, and can be permanently deformed. A stress-working is advantageously reduced to a minimum because with arrangements of sabot bodies being made entirely out of metal the finishing working of the surfaces, the formation of grooves for a corresponding guide band, and the presegmenting, when joining by means of synthetic material, is carried out by introduction into the dove-tailed grooves of such synthetic material for improving the joining between the metal and the synthetic material and the presegmenting of the assembly.

Whereas in the arrangement of FIGS. 12 and 13 there is illustrated a sabot body being made out of a uniform material, the sabot body can also be manufactured in the sense of the embodiments of FIGS. 14, 15 and 16.

The selection of material is determined by the demands of having sufficient mechanical strength with as much as possible reduced density. With arrangements wherein the central portion is of unitary construction and made out of metal, it is recommended to select a light metal alloy, for example an alloy having an aluminum or titanium base. In those arrangements having shaped sheet metals, such parts can be at least partially made out of steel. As synthetic material there is recommended, for example, an epoxy resin which is reinforced by means of fiber glass, carbon or synthetic materials.

Moreover, the separating slots 45, 46, 60 can be advantageously hermetically sealed by pouring into them a hardenable substance which is capable of being cast. In order to adapted the arrangements of the invention the projectile contours and concomitant sabot arrangements other than those described hereinabove in connection with the illustrated embodiments, other structures can be selected and thereby further inventive combinations can be realized. In this connection all of the afore-described features of the invention are considered to be inventive.

The sheet metal parts can be made out of conventional sheet metal having a thickness 0.35 mm and are delivered as a semifinished product. A particularly advantageous material is an AA7075 wrought alloy having aluminum as a main constituent.

The densities of the synthetic material which are suitable for the casting step (sealing of slots 45, 46, 60 by pouring synthetic material into them) fall within narrow limits. These densities are, however, less than half the density of the sheet metal material. The apparent average density of combined material is therefore substantially less than that of the material for a conventional prior art sabot, for example, wrought aluminum alloy. The total dead load of the projectile, being armed, wtih a sabot in accordance with this invention is therefore significantly lowered. The "dead load" means the mass which is being accelerated up to the muzzle exit velocity during its travel through the gun barrel, but which is not the target effective mass.

There now follow examples of materials for the sheet metal elements and parts.

Aluminum wrought alloy AA7075 1) having a density of 2.8 grams/cm$^3$ (1) International Registration number, Aluminum Association Washington, D.C.

Example of synthetic materials for pouring and casting into slots 45, 46, 60:
  (1) non-modified epoxy resin (density/25 grade C:1.17 grams/cm$^3$)
      amine hardener (specific gravity/20 grade C:0.92 grams/cm$^3$)
  (2) polymer-modified polyamide 6
  (3) glass-fortified nylon 6/10 and nylon 6/12; THERMOCOMP ® IF Series: IF-100 glass content: 30% specific gravity 1.3
  (4) Carbon Fiber reinforced thermoplastic composites LNP THERMOCOMP ® Base Resin: Nylon 6/10 and nylon 6/12 (e.g. grade IC-1006); carbon fiber content 30%, specific gravity 1.22
  (5) Elastomer-modified polyamide 6; glass fiber reinforced, glass content: 25%.

The expression "large length/diameter ratio" projectile refers to a subcaliber projectile of the type described in U.S. Pat. No. 4,075,946 wherein said ratio is at least 10.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

We claim:

1. Sabot for a fin-stabilized subcaliber projectile having a large length/diameter ratio, wherein said sabot embraces said subcaliber projectile in a predetermined region between its nose and its tail stabilization unit, said sabot comprising
   (a) a unitary sabot body
   (b) said sabot body having an axial bore and a plurality of angularly equidistantly spaced partial radial cuts defining gaps which partially divide said sabot body into a plurality of equal partial segments;
   (c) a mating insert mounted in each gap;
   (d) each gap forming a fracture zone in the outer periphery of said sabot;
   (e) means for joining said sabot to said subcaliber projectile;
   (f) means for sealing at least the radially outer region of the gap formed by each cut;
   (g) said sabot forming a forwardly directed air pocket and each cut forming in said air pocket a forwardly disposed radially outer and a radially disposed inner material bridge;
   (h) each cut forming at least one rearwardly disposed material bridge;
   (i) said forwardly disposed and rearwardly disposed material bridges abutting against the insert mounted in each gap;
   (j) each insert in each gap having a radially innermost portion which extends along said axial bore, said radially innermost portion of each insert and said axial bore forming an internal thread;
   (k) said inserts sealing said gaps in a gas-tight manner; and
   (l) said sabot having an outer annular groove for matingly receiving a sealing ring therein.

2. The sabot for a fin-stabilized subcaliber projectile as set forth in claim 1, wherein said unitary sabot body is made of a metal alloy.

3. The sabot for a fin-stabilized subcaliber projectile as set forth in claim 1, wherein said unitary sabot body is made of a hardenable resin.

4. The sabot for a fin-stabilized subcaliber projectile as set forth in claim 1, wherein said inserts are made of a hardenable resin.

5. The sabot for a fin-stabilized subcaliber projectile as set forth in claim 1, wherein said inserts are made of sheet metal.

6. The sabot for a fin-stabilized subcaliber projectile as set forth in claim 1, wherein said sabot body has at least two partial radial cuts which are 180 degrees angularly spaced from each other and at least two inserts are loosely abuttingly mounted in the gaps formed by said cuts, the rear ends of said abutting inserts are firmly bonded to the material forming the sabot body.

7. The sabot for a fin-stabilized subcaliber projectile as set forth in claim 6, including additional inserts mounted between sets of abutting inserts, said additional inserts also being firmly bonded to the material forming said sabot body.

8. The sabot for a fin-stabilized subcaliber projectile as set forth in claim 7, including a plurality of supplementary cuts forming a plurality of supplementary gaps, supplementary inserts are disposed in said supplementary gaps and said supplementary inserts are made of metal foil.

9. The sabot for a fin-stabilized subcaliber projectile as set forth in claim 8, wherein the rear end of said sabot has a synthetic cover, said fracture zones extending into said cover.

10. The sabot for a fin-stabilized subcaliber projectile as set forth in claim 7, wherein said inserts and additional inserts have holes which are filled with synthetic resin forming said sabot to thereby firmly bond said inserts and additional inserts to said sabot body.

* * * * *

UNITED STATES PATENT AND TRADEMARK OFFICE
CERTIFICATE OF CORRECTION

PATENT NO. : 4,702,172

DATED : October 27, 1987

INVENTOR(S) : Wallow et al

It is certified that error appears in the above-identified patent and that said Letters Patent are hereby corrected as shown below:

Item [75]:

On the title page, add

-- Jean-Claude SAUVESTRE, Doulchard, France -- as an Inventor.

Signed and Sealed this

Eighth Day of March, 1988

Attest:

DONALD J. QUIGG

Attesting Officer

Commissioner of Patents and Trademarks